United States Patent [19]

Uehara

[11] Patent Number: 5,220,595
[45] Date of Patent: Jun. 15, 1993

[54] VOICE-CONTROLLED APPARATUS USING TELEPHONE AND VOICE-CONTROL METHOD

[75] Inventor: Kensuke Uehara, Tokyo, Japan

[73] Assignee: Kabushiki Kaisha Toshiba, Kawasaki, Japan

[21] Appl. No.: 800,722

[22] Filed: Dec. 3, 1991

Related U.S. Application Data

[63] Continuation of Ser. No. 487,445, Mar. 2, 1990, abandoned.

[30] Foreign Application Priority Data

May 17, 1989 [JP] Japan ................... 1-123613

[51] Int. Cl.[5] ........................ G06F 3/16; G10L 5/06
[52] U.S. Cl. ................................. 379/74; 379/67; 379/77; 381/42; 369/50
[58] Field of Search ............... 369/50; 379/74-78, 379/80, 67, 88; 381/42; 364/513.5

[56] References Cited

U.S. PATENT DOCUMENTS

| 4,697,282 | 9/1987 | Winter et al. | 379/67 |
| 4,737,976 | 4/1988 | Borth et al. | 379/58 |
| 4,827,461 | 5/1989 | Sander | 369/7 |
| 4,833,713 | 5/1989 | Muroi et al. | 381/42 |
| 4,850,005 | 7/1989 | Hashimoto | 379/80 X |

FOREIGN PATENT DOCUMENTS

| 0181767 | 10/1984 | Japan | 381/42 |
| 0159933 | 8/1985 | Japan | 379/88 |

Primary Examiner—Stuart S. Levy
Assistant Examiner—Joseph A. Rhoa
Attorney, Agent, or Firm—Oblon, Spivak, McClelland, Maier & Neustadt

[57] ABSTRACT

A voice-controlled device of this invention includes a receiving/discriminating mechanism for receiving a DTMF signal externally input through a telephone line and discriminating the DTMF signal, a level detecting mechanism for detecting a signal level of the DTMF signal input to the receiving/discriminating mechanism, a speech recognizer for recognizing the content of a voice signal externally input through the telephone line, an input level adjustor for adjusting a signal level of the voice signal input to the speech recognizer on the basis of the signal level detection result by the level detecting mechanism, and a function executor for executing a function according to the content of the voice signal recognized by the speech recognizer.

15 Claims, 3 Drawing Sheets

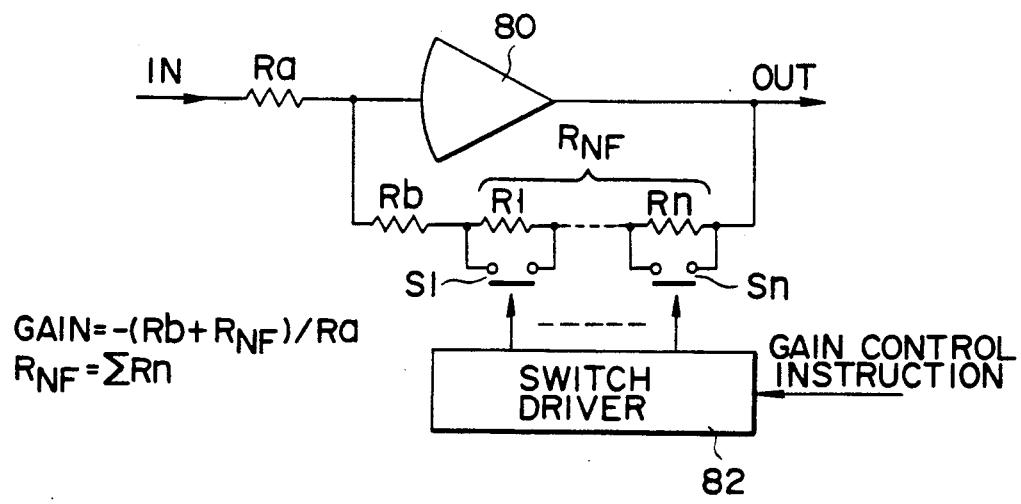
F I G. 2
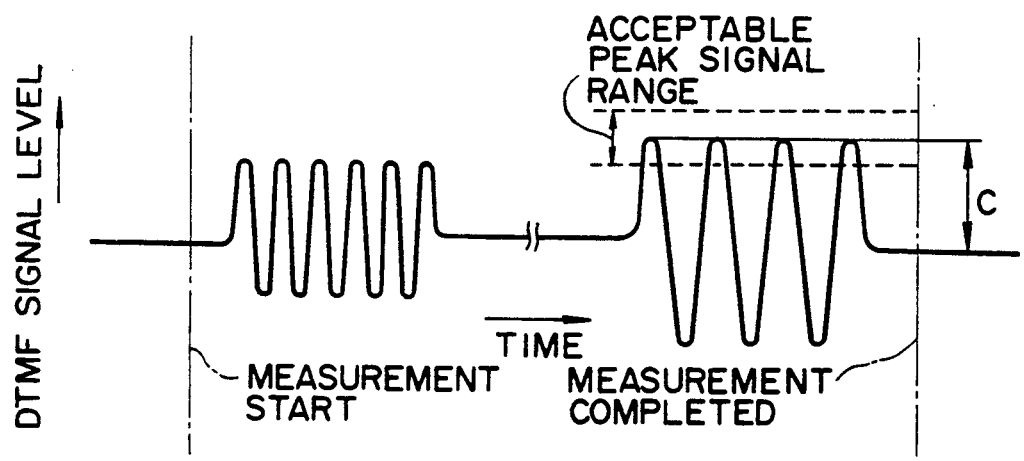
F I G. 3

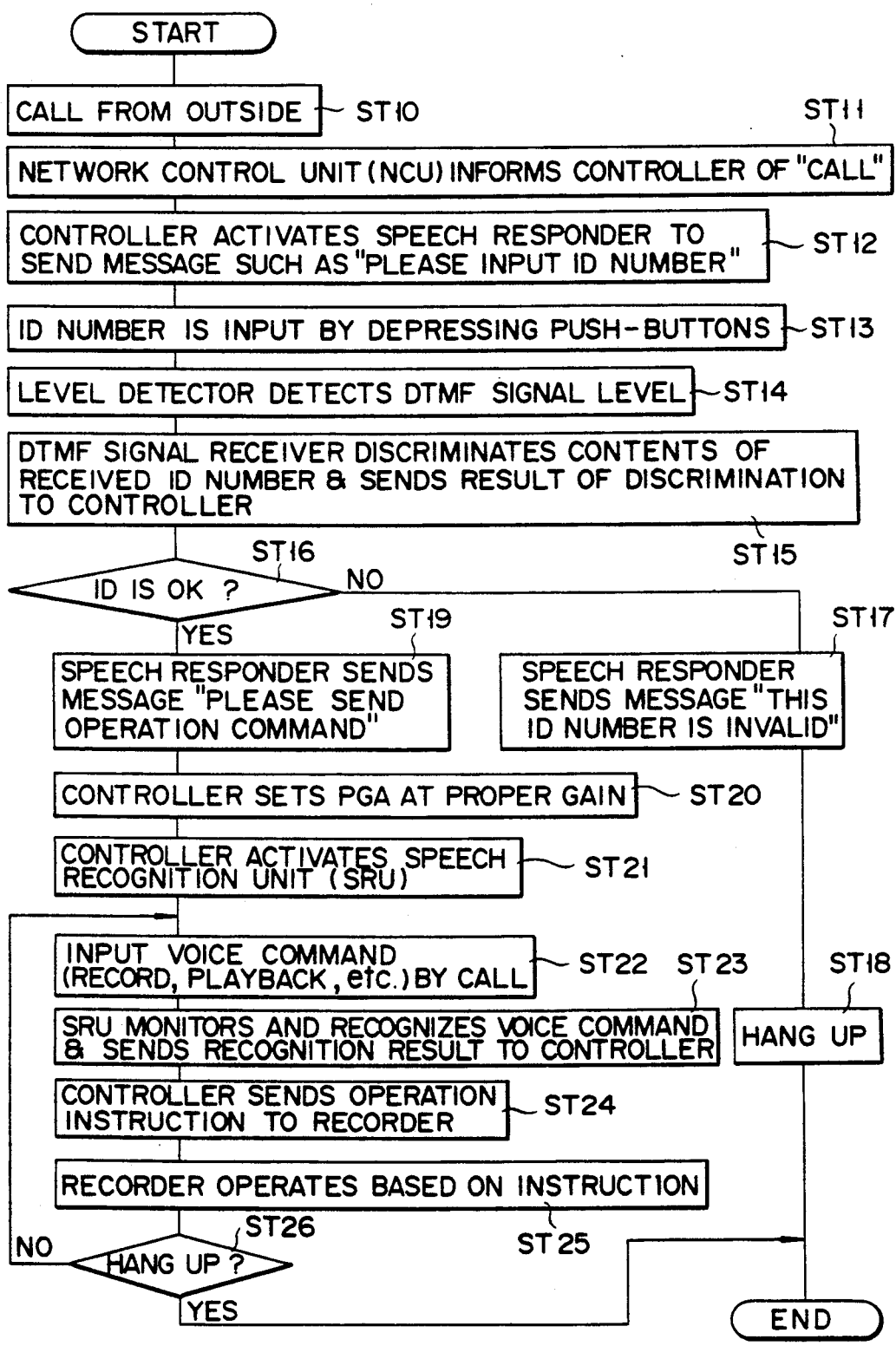
F I G. 4

VOICE-CONTROLLED APPARATUS USING TELEPHONE AND VOICE-CONTROL METHOD

This application is a continuation of application Ser. No. 07/487,445, filed on Mar. 2, 1990, now abandoned.

BACKGROUND OF THE INVENTION

1. Field of the Invention

The present invention relates to a voice-controlled apparatus such as a so-called automatic answering telephone having an automatic answering function.

2. Description of the Related Art

Some conventional automatic answering telephones have a function for receiving a push phone dial signal. With a telephone of this type, a user can make a telephone call to this telephone from an outdoor telephone to hear a recorded message. In this case, the user inputs an ID number (identification data) by depressing the push buttons on the outdoor telephone.

The ID number is converted to a DTMF (Dual Tone Multi Frequency) signal used as the push phone dial signal, and reaches the automatic telephone through the telephone line, where it is encoded. When the encoded DTMF signal coincides with a number registered in advance in the automatic answering telephone, the user can hear the recorded content.

In order to hear the recorded content, push buttons are depressed to designate a predetermined operation. For example, "1" designates a rewind operation; "2", a fast-forward operation; "3", a playback operation; and "4", a stop operation. The automatic answering telephone receives these DTMF signals and executes the designated function.

However, since the above operation functions are encoded by numerals, the user may tend to forget the correspondence between the operations and codes.

Thus, if each operation is designated by a voice or voice input (e.g., a word "rewind", "fast-forward", "playback", or "stop"), and the designated operation is recognized by the automatic answering telephone, the user can easily actuate the above operations.

In order to execute speech recognition with existing techniques, a voice level input to a speech recognition means must be appropriate. However, the level of a voice signal externally input through a telephone line varies considerably. Causes of the variation are mainly present in the state of the telephone line. More specifically, when the telephone line suffers from a large signal transmission loss, the level of the voice signal reaching the speech recognition means is decreased. However, when a user makes a local telephone call, the transmission loss on the telephone line is very small, therefore a high level voice signal can be input to the speech recognition means.

More specifically, when the telephone line is connected to the speech recognition means, the input level of a voice signal varies considerably depending on the state of the telephone line between the calling party and the speech recognition means. Therefore, this state is very disadvantageous for a speech recognition apparatus, and accurate speech recognition may not always be attained.

SUMMARY OF THE INVENTION

It is therefore an object of the present invention to solve the problem of the level of a voice input to a speech recognition means varying depending on the state of a telephone line, disturbing accurate speech recognition, and to provide a voice-controlled apparatus which can maintain a proper input level to the speech recognition means, so that highly accurate speech recognition can be achieved.

A voice-controlled apparatus according to the present invention comprises: receiving/discriminating means for receiving and discriminating a DTMF signal externally input through a telephone line; level detecting means for detecting the signal level of the DTMF signal input to the receiving/discriminating means; speech recognition means for recognizing the content of a voice signal externally input through the telephone line; input level adjusting means for adjusting the signal level of the voice signal input to the speech recognition means, on the basis of the signal level detection result of the level detecting means; and function executing means for executing a function according to the content of the voice signal recognized by the speech recognition means.

In the above arrangement, an initially input DTMF signal is discriminated, and its reception level is measured. The input level of the speech recognition means is adjusted to a proper value on the basis of the detected reception level. Thereafter, a voice signal to be recognized is input to the speech recognition means.

Since a DTMF signal can be satisfactorily discriminated by existing techniques, an ID number can be reliably discriminated. When the reception level of the DTMF signal is detected simultaneously with discrimination of the DTMF signal, the degree of loss caused by the telephone line can be measured. Thus, the subsequent input level of the speech recognition means can be properly maintained by compensating for the measured loss. As a result, speech recognition can always be highly accurately achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 shows details of a programmable gain amplifier used in the embodiment of FIG. 1;

FIG. 3 shows a waveform diagram for explaining an operation for detecting the level of a DTMF signal; and FIG. 4 is a flow chart for explaining an operation of the embodiment of FIG. 1.

DETAILED DESCRIPTION OF THE PREFERRED EMBODIMENTS

Figure 1:
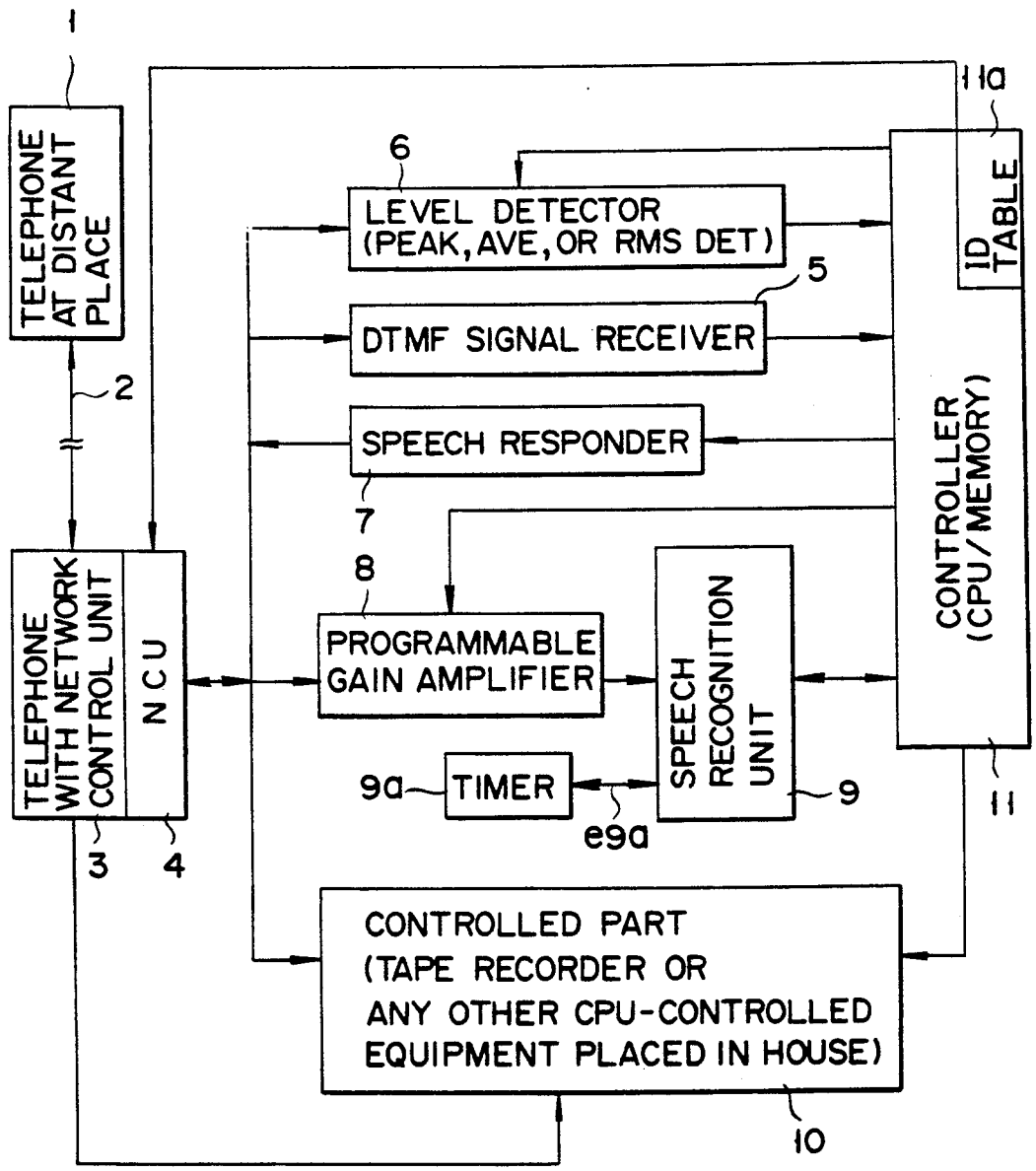
FIG. 1 is a block diagram showing a voice- o controlled apparatus according to an embodiment of the present invention.

A voice-controlled apparatus according to an embodiment of the present invention will be described below with reference to the accompanying drawings.

In FIG. 1, reference numeral 1 denotes a telephone at a distant place; and 2, a telephone line. Reference numeral 3 denotes a telephone with a network control unit 4 (to be referred to as an NCU hereinafter). Telephone 3 has a function of receiving a voice signal input from telephone line 2 or sending a voice signal out on telephone line 2.

Reference numeral 5 denotes a DTMF signal receiver for receiving and encoding a DTMF signal. Reference numeral 6 denotes a level detector for detecting the reception level of a DTMF signal input through NCU 4. Reference numeral 7 denotes a speech responder having a conventional voice synthesizing circuit and a circuit for driving the synthesizing circuit. Speech responder 7 sends a voice message to the calling party. Reference numeral 8 denotes a PGA (programmable gain control amplifier) for controlling the magnitude of a voice level input to speech recognition unit 9 (to be described later). Reference numeral 9 denotes the speech recognition unit for recognizing a voice signal (word voice signal) input from telephone line 2 through NCU 4. Reference numeral 10 denotes a tape recorder (automatic answering means) which is controlled by controller 11 (to be described later). Reference numeral 11 denotes the controller for controlling the entire apparatus shown in FIG. 1.

Various speech recognition techniques may be executed by speech recognition unit 9. For example, a technique disclosed in the following reference:

Yoichi TAKEBAYASHI et al., "TELEPHONE SPEECH RECOGNITION USING A HYBRID METHOD", IEEE 7th International Conference on Pattern Recognition Proceedings, (Jul. 30–Aug. 2, 1984), Montreal, Canada, pp. 1232–1235.

The present specification incorporates the disclosure of the above reference.

FIG. 2 shows details of PGA 8 used in the embodiment shown in FIG. 1.

An input DTMF signal is input to the inverted input terminal of operational amplifier 80 through resistor Ra. The output from operational amplifier 80 is negatively fed back to the inverted input terminal of operational amplifier 80 through feedback resistors RNF and Rb.

Feedback resistors RNF include n series-connected resistors R1 to Rn. Resistors R1 to Rn are connected in parallel with electronic switches S1 to Sn. In this case, gain G of the entire circuit shown in FIG. 2 is given by:

$$G = -(Rb + RNF)/Ra \quad (1)$$

Feedback resistors RNF are expressed by:

$$RNF = R1 + R2 + \ldots + Rn \quad (2)$$

Switches S1 to Sn are turned on/off in response to n outputs from switch driver 82. The output from switch driver 82 is determined on the basis of a gain control instruction from controller 11.

Assume a simple example wherein the gain control instruction is 2-bit binary data [x,y], resistors RNF include only two resistors R1 and R2, and the number of switches Sn is 2 (S1 and S2). When [x,y]=[0,0], since both switches S1 and S2 are set ON, RNF=0. When [x,y]=[0,1], since switch S1 is set OFF and switch S2 is set ON, RNF=R1. When [x,y]=[1,0], since switch S1 is set ON and switch S2 is set OFF, RNF=R2. When [x,y]=[1,1], since both switches S1 and S2 are set OFF, RNF=R1+R2. In this manner, since resistors RNF can have four resistances, PGA 8 can have one of four gains according to equation (1).

As described above, the gain of PGA 8 is controlled on the basis of the gain control instruction from controller 11.

Note that PGA 8 may be arranged as follows. That is, four amplifiers having different fixed gains are prepared, and a DTMF signal is input to each of these amplifiers. A DTMF signal, amplified with a predetermined fixed gain selected based on gain control instruction, is extracted from one of the amplifiers.

The operation of the arrangement shown in FIG. 1 will be described below, with reference to the waveform diagram of FIG. 3 and the flow chart of FIG. 4. A user makes a telephone call to telephone using outside telephone 1 (ST10). NCU 4 provided in telephone 3 is enabled to interrupt a CPU in controller 11 (ST11). Thus, controller 11 enables speech responder 7 to send, to telephone 1 through telephone line 2, a message such as "I (owner) am out. Please leave a message on the recorder, or please input ID number." (ST12). When the user depresses the push buttons of telephone 1 to input an ID number (ST13), level detector 6 detects the signal level of the DTMF signal (left waveform in FIG. 3) of the ID number (ST14). Parallel to the level detection, DTMF signal receiver 5 discriminates the content of the received DTMF signal, and sends the discrimination result to controller 11 (ST15).

The CPU in controller 11 compares the sent discrimination result (the ID number input by the user) with ID number table 11a registered in its own memory. If the discrimination result indicates non-registration (NO in step ST16), controller 11 enables speech responder 7 to send a message such as "This ID number is invalid." (ST17), and subsequently cancels the telephone call (ST18). When the telephone call is cancelled, the operation of the apparatus shown in FIG. 1 is completed.

If the sent discrimination result indicates registration of the ID number (YES in step ST16), the controller 11 sends a message such as "Please send an operation command." (ST19).

After the operation command message is sent, the CPU in controller 11 controls the gain of PGA 8 on the basis of the reception level of the DTMF signal detected in step ST14 (ST20). More specifically, when the reception level of the DTMF signal is low, the gain of PGA 8 is increased; otherwise, the gain of PGA 8 is decreased, so that the input signal level of speech recognition unit 9 always falls within a predetermined range (acceptable range in FIG. 3). After the gain control, the CPU in controller 11 enables speech recognition unit 9 (ST21).

The operations in steps ST20 and ST21 are executed within a very short period of time until the user sends the subsequent operation command.

The user sends a word (operation command) indicating a desired operation (e.g., RECORD, PLAYBACK, STOP, PAUSE, REWIND, FAST FORWARD, etc.) from telephone 1 in response to the operation command request message in step ST19 (ST22). Speech recognition unit 9 recognizes the sent voice operation command, and inputs the recognition result to controller 11 (ST23). The CPU in controller 11 sends an operation instruction corresponding to the input recognition result (e.g., RECORD) to tape recorder 10 (ST24). Tape recorder 10 executes an operation (RECORD) according to the sent operation command (ST25).

The operations in steps ST22 to ST25 continue as long as the telephone is connected (NO in step ST26). If the telephone is hung up (YES in step ST26), the operation of the apparatus shown in FIG. 1 is completed.

The user of telephone 1 need only speak a message content when he or she wants to record a message, and the voice content is recorded on tape recorder 10. When the message is over and telephone 10 is hung up, all the processing operations are completed, and telephone 3 returns to its initial state.

The above operations can be summarized as follows. When the user wants to hear the recorded content using outside telephone 1, he depresses the push buttons of telephone 1 to input his ID number. For example, if the ID number is a four-digit number "1234", buttons "1", "2", "3", and "4" are depressed in turn.

The input ID number is converted to a DTMF signal, and the DTMF signal is input to DTMF signal receiver 5 through telephone line 2 and NCU 4 of telephone 3. DTMF signal receiver 5 discriminates the ID number from the input DTMF signal, and sends the discrimination result to controller 11.

When NCU 4 is enabled to interrupt controller 11, controller 11 enables level detector 6. Level detector 6 detects positive peak value C of the input DTMF signal (right waveform in FIG. 3) during a time period enabled by controller 11 (time period from measurement start up to completion of measurement), and sends the detection result to controller 11.

When controller 11 determines that DTMF signal receiver 5 detects a DTMF signal of the predetermined number of digits, controller 11 sends a measurement end instruction to level detector 6.

When a telephone call is made from telephone 1, tape recorder 10 starts a recording operation. When DTMF signal receiver 5 detects that a DTMF signal is input, controller 11 immediately sends a pause command to tape recorder 10 to pause the recording operation.

Controller 11 checks the discriminated ID number to determine if the ID number is valid. If the ID number is invalid, controller 11 enables speech responder 7 to send, to telephone 1, a message "This ID number is invalid.", and cancels the telephone call.

If the ID number is valid, speech responder 7 sends to telephone 1, a message such as "This ID number is valid, please input a tape recorder operation command."

Controller 11 calculates the proper input level of speech recognition unit 9 on the basis of peak value C of the DTMF signal (or an average value or an effective value) detected by level detector 6. Peak value C corresponds to state of signal loss of active telephone line 2 (that is, as the loss is larger, peak value C becomes smaller). When the proper level is calculated in this manner, controller 11 adjusts the gain of PGA 8 so that a voice signal having the calculated proper level is input to speech recognition unit 9.

After the input level of speech recognition unit 9 is adjusted, controller 11 enables speech recognition unit 9 to allow the voice signal to be input through telephone line 2, NCU 4, and PGA 8. The voice signal of the operation command spoken at the handset of telephone 1 is input to, and recognized by, speech recognition unit 9. The recognition result is supplied to controller 11.

Note that the sound (voice) of an input operation command is a word, e.g., "RECORD", "PLAYBACK", "STOP", "FAST FORWARD", "REWIND", or the like.

If speech recognition unit 9 employs an unspecified speaker word recognition system (see the above IEEE reference "Telephone Speech Recognition Using a Hybrid Method"), the sound of any word can be recognized, resulting in an ideal apparatus. However, when only one user uses the automatic answering telephone, a specified speaker word recognition system, in which user's voice pattern data is registered in a RAM dictionary (not shown) to allow only the user to use the apparatus, may be employed.

Controller 11 sends a command corresponding to an operation to be instructed to logic-controlled type tape recorder 10 on the basis of the recognition result from speech recognition unit 9. Thus, tape recorder 10 executes the instructed operation. This operation includes mechanical operations.

In recording, when controller 11 sends a corresponding command to tape recorder 10, tape recorder 10 executes a recording operation. A voice signal input from telephone line 2 is recorded by tape recorder 10.

On the other hand, the voice signal is also input to speech recognition unit 9 through PGA 8. Speech recognition unit 9 monitors a voice OFF time using timer 9a which is enabled when the level of an input voice envelope decreases below a predetermined level. When timer 9a detects that no voice signal is input over a predetermined period of time, signal e9a, indicating this, is generated to inform controller 11 of the rest state. In this case, controller 11 determines this state as a state of waiting for the next operation command, and sends a recognition operation start enable command to speech recognition unit 9.

Thereafter, the voice signal input from telephone line 2 is recognized by speech recognition unit 9, and the recognition result is sent to controller 11. Controller 11 then sends an operation command to tape recorder 10 to execute the predetermined operation, which in this case is, e.g., a pause operation.

Similarly, when a fast-forward or rewind command is input from outside telephone 1, and a playback command is sent thereafter, the recorded content can be checked.

Tape recorder 10 can be separated from the main telephone body, and function as an independent unit. More specifically, when the user returns home from outside, he can hear the recorded content upon operation of tape recorder 10. The method of operating tape recorder 10 is exactly the same as a conventional tape recorder.

In this manner, an ID number is input using a DTMF signal which can be reliably discriminated. Upon reception of the DTMF signal, the signal loss state of the telephone line, i.e. the reception level of the DTMF signal, is detected. A control command of the tape recorder of the automatic answering telephone is input by a voice from an outside telephone, and is recognized by recognition unit 9. As a result, an automatic answering telephone which is very simple and easy to operate can be obtained. The voice level input to speech recognition unit 9 is adjusted to a proper value on the basis of the reception level of the DTMF signal (loss state of the telephone line), thus maintaining the input level of the speech recognition unit in the proper state, corresponding to the signal loss state of the telephone line. Thus, highly accurate speech recognition can always be assured.

As described above, according to the present invention, there can be provided a voice-controlled apparatus which can always maintain the input level to a speech recognition means in a proper state when the speech recognition means is connected, and can assure highly accurate speech recognition.

Note that block 10 in FIG. 1 is not limited to a tape recorder. For example, when the apparatus shown in FIG. 1 is equipped in an automatic teller machine in a bank, a user can inquire about his or her balance using an outdoor telephone. When block 10 is equipped in a computer-controlled automatic baker, a computer-controlled bath, or a computer-controlled VCR, a user can send an instruction (e.g., baking, bath preparation, and recording of a TV program by the VCR) to the apparatus shown in FIG. 1 by words, without using difficult operation commands.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A voice-controlled apparatus adapted to a telephone system, comprising:
    means for receiving and discriminating a content of a DTMF signal sent from a telephone line of the telephone system;
    means for detecting a reception signal level of the DTMF signal sent to said discriminating means to provide a result indicative of the reception signal level of the DTMF signal;
    means for recognizing content of voice signal sent from the telephone line;
    means for adjusting a reception signal level of the voice signal sent to said recognizing means in accordance with the result of the reception signal level of the DTMF signal detected by the detecting means, so that an adjusted voice signal level of the voice signal is provided which is sufficient to ensure a proper recognition of the content of said voice signal by the recognizing means; and
    means for executing a specific function defined by the content of said voice signal recognized by said recognizing means.

2. A voice-controlled apparatus according to claim 1, wherein said executing means includes:
    means for recording and playing back voice information; and
    means for controlling an operation of said recording/playing back means in accordance with the content of said voice signal recognized by said recognizing means.

3. A voice-controlled apparatus according to claim 1, wherein said executing means includes:
    a computer-controlled equipment; and
    means for controlling an operation of said computer-controlled equipment in accordance with the content of said voice signal recognized by said recognizing means.

4. A voice-controlled apparatus according to claim 1, wherein said recognizing means includes means for monitoring discontinuity of a signal envelope of the voice signal sent from the telephone line, and for generating a discontinuity signal for indicating when a period of absence of the monitored signal envelope exceeds a predetermined period of time, and
    said executing means includes means for activating said recognizing means in response to the generation of said discontinuity signal.

5. A voice-controlled apparatus according to claim 1, wherein said detecting means includes means for detecting a peak level of said DTMF signal.

6. A voice-controlled apparatus according to claim 1, wherein said detecting means includes means for detecting an rms level of said DTMF signal.

7. A voice-controlled apparatus according to claim 1, wherein said detecting means includes means for detecting an average level of said DTMF signal.

8. A voice-controlled apparatus according to claim 1, wherein said adjusting means includes a multi-gain amplifier having a plurality of selectable gain factors, each of said gain being selected in accordance with the result of said signal level detection.

9. A voice-control method adapted to a telephone system, comprising the steps of:
    discriminating a content of a DTMF signal received form a telephone line of the telephone system;
    detecting a reception signal level of the DTMF signal to provide a result indicative of the reception signal level detected;
    recognizing content of voice signal sent from the telephone line;
    adjusting a reception signal level of the voice signal in accordance with the result of the DTMF signal level detection, so that an adjusted voice signal level is provided which ensures a proper recognition of the content of said voice signal; and
    executing a specific function defined by the content of said voice signal recognized by said recognizing step.

10. A voice-controlled method according to claim 9, wherein said executing step includes the steps of:
    recording and playing back voice information; and
    controlling an operation of said recording/playing back step in accordance with the content of said voice signal recognized by said recognizing step.

11. A voice-controlled method according to claim 9, wherein said executing step includes a step of controlling an operation of a computer-controlled equipment in accordance with the content of said voice signal recognized by said recognizing step.

12. A voice control method according to claim 9, wherein said recognizing step includes a step of monitoring discontinuity of a signal envelope of the voice signal sent form the telephone line, and generating a discontinuity signal for indication when a period of absence of the monitored signal envelope exceeds a predetermined period of time; and
    said executing step includes a step of activating said recognizing step in response to the generation of said discontinuity signal.

13. A voice-control method according to claim 9, wherein said detecting step includes a step for detecting a peak level of said DTMF signal.

14. A voice-control method according to claim 9, wherein said detecting step includes a step for detecting an rms level of said DTMF signal.

15. A voice-control method according to claim 9, wherein said detecting step includes a step for detecting an average level of said DTMF signal.

* * * * *